United States Patent [19]

Barnsley et al.

[11] 4,257,311

[45] Mar. 24, 1981

[54] CONTROL SYSTEMS

[75] Inventors: Michael P. Barnsley; Edward S. Eccles, both of Cheltenham, England; Ralph Taylor, Bellevue, Wash.

[73] Assignee: Smiths Industries Limited, London, England

[21] Appl. No.: 43,862

[22] Filed: May 29, 1979

[30] Foreign Application Priority Data

May 30, 1978 [GB] United Kingdom ............... 24018/78

[51] Int. Cl.³ .......................... F15B 9/03; F15B 9/09; F15B 13/06
[52] U.S. Cl. .................................. 91/363 A; 91/438; 91/448; 91/510; 92/131
[58] Field of Search ............................... 91/363 A, 510

[56] References Cited

U.S. PATENT DOCUMENTS

| | | | |
|---|---|---|---|
| 3,270,623 | 9/1966 | Gorngost et al. | 91/510 |
| 3,505,929 | 4/1968 | Coppola | 91/363 A |

Primary Examiner—Paul E. Maslousky
Attorney, Agent, or Firm—Pollock, Vande Sande & Priddy

[57] ABSTRACT

A hydraulic control system has two fluid supply circuits which control fluid pressure supplied to respective chambers of a fluid-controlled actuator, each chamber having an individual piston mounted on a common actuator rod. In normal operation, a major part of the pressure is supplied to the actuator by the first circuit in accordance with control signals derived from an external source. The second circuit supplies pressure to its respective chamber at a lower level in accordance with control signals derived from the differential pressure across the piston in that chamber, the pressure supplied by the second circuit acting to reduce the differential pressure across the piston. The system also includes a control unit that responds to malfunction of the first circuit or error in the control signals supplied to the first circuit, by disconnecting the first control circuit from control of the actuator, such as by equalizing pressure across the piston in the first chamber. Upon detection of a malfunction or error, the control unit also supplies to the second circuit, instead of the signals derived from the differential pressure, control signals nominally-identical to the control signals supplied to the first circuit and derived from an external source. In this way, following detection of a malfunction in the first circuit, the second circuit controls the major part of the pressure supplied to the actuator.

10 Claims, 3 Drawing Figures

CONTROL SYSTEMS

BACKGROUND OF THE INVENTION

This invention relates to control systems.

The invention is particularly, though not exclusively, concerned with fluid or hydraulic control systems for use in conjunction with an actuator linked to the control surfaces (such as, for example, the ailerons or rudder) of an aircraft.

It is important in many applications of control systems to provide protection against failure or malfunction in the system. This is, of course, especially important for applications in aircraft. It is common practice in, for example, hydraulic control systems to provide such protection by using two hydraulic circuits to control movement of a single actuator. The two circuits are operated simultaneously, malfunction being detected by comparing the behaviour of the two circuits. This may be done by providing feedback to the two circuits such that an excessively high or low output force from only one circuit results in an opposing output from the other circuit to counteract it. Although this arrangement may help reduce the effects of a malfunction, it is difficult to maintain control of the system since in general it is not possible to identify within which of the two circuits the malfunction occurs.

Some previous arrangements, alternatively, have had two hydraulic circuits only one circuit being operated at any time, the other circuit being switched to control the actuator if a malfunction is detected. This arrangement is preferable since it gives full control of the system once the switching has taken place. With this arrangement, however, it can take a relatively long time for the switching to be effected since it is necessary to open and close various hydraulic valves in order to switch out one circuit and to switch in the other. This can be a severe disadvantage, and this is especially so where the system is used in conjunction with aircraft control surfaces since the aircraft may be out of control during this time.

BRIEF SUMMARY OF THE INVENTION

It is an object of the present invention to provide an improved control system that may be used to alleviate the above disadvantages.

According to one aspect of the present invention there is provided a control system for use in controlling force applied to actuator means for producing a displacement thereof, including first and second circuits both of which are arranged for supplying signals to control said force wherein, in normal operation, the said first circuit is arranged to supply first signals for controlling a major part of the said force in accordance with first control signals, the said second circuit being arranged to supply second signals for controlling just sufficient force to reduce the effect of any resistance to displacement of said actuator means, said second signals being derived in accordance with the force controlled by said first signals, and the system being arranged such that upon detection of a malfunction in said first circuit or of an error in said first control signals, the said second circuit is switched to supply signals controlling a major part of the force applied to the said actuator means in response to second control signals.

By having two circuits operating in this way with the first circuit controlling the major part of the force and the second circuit a lesser part of the force, it has been found that the second circuit can be switched to control the major part of the force more quickly than has been possible heretofore. Since moreover, the second circuit is functioning during normal operation, even though only controlling a lesser part of the force, it is nevertheless possible to monitor the functioning of the second circuit in a way that would not be possible with some previous arrangements where the second circuit does not function at all during normal operation of the system.

The control system may be a fluid control system and the first and second circuits may control fluid pressure supplied to a fluid-controlled actuator. The first circuit in this case may control fluid pressure supplied to a first chamber of the actuator having one piston, and the second circuit may control fluid pressure supplied to a second separate chamber of the actuator having another piston. The second signals may be derived in accordance with differential fluid pressure across the piston in the second chamber such as to tend to reduce the differential fluid pressure.

Although the present invention has its main application in fluid control systems it will be appreciated that it may also be used in, for example, electrical control systems in which the first and second circuits are provided by first and second electrical circuits. In such electrical control systems the actuator may be an electromagnetic actuator such as, for example, a torque motor, the electrical circuits being, for example, coupled to different windings of the motor. Alternatively the actuator may be a fluid-controlled actuator and the fluid-pressure supplied to the actuator may be controlled by the first and second electrical circuits.

A hydraulic control system in accordance with the present invention and for use in an aircraft will now be described, by way of example, with reference to the accompanying drawings.

DETAILED DESCRIPTION

Figure 1:
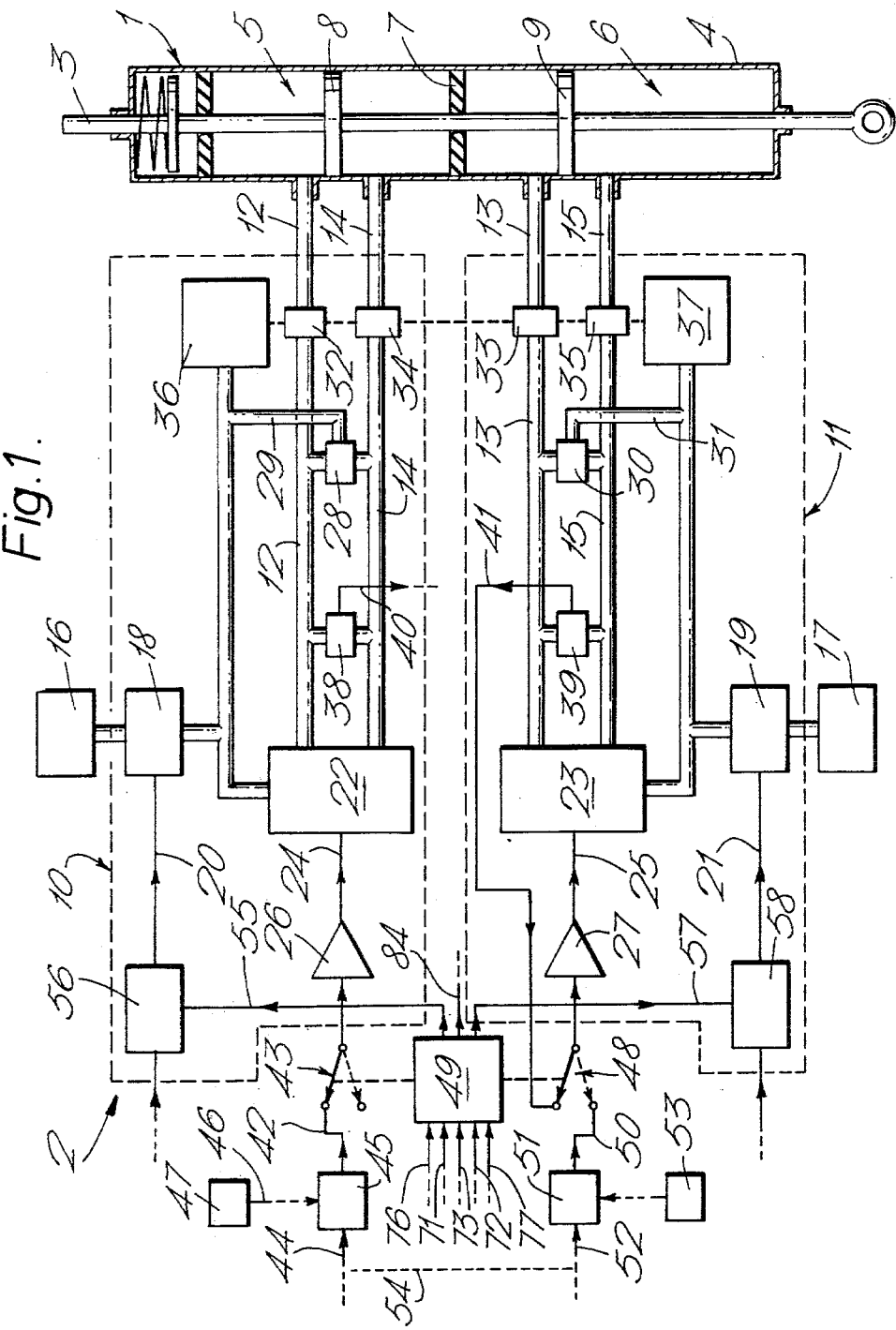
FIG. 1 represents schematically a part of the hydraulic control system together with an hydraulic actuator.

With reference to FIG. 1, there is shown an hydraulic actuator 1 together with its associated hydraulic control system indicated generally as 2.

The actuator 1 has an actuator rod 3, which is displaced along the cylinder 4 of the actuator in accordance with fluid supplied to the cylinder from the control system 2. The cylinder 4 is divided into two actuator sub-chambers 5 and 6 which are separated from one another by a fluid-tight seal 7. The actuator rod 3 has two pistons 8 and 9 which are spaced apart along the length of the rod and which are located in the actuator sub-chambers 5 and 6 respectively.

The hydraulic control system 2 is effectively divided into two sub-circuits 10 and 11 which are associated respectively with the actuators sub-chambers 5 and 6. Hydraulic fluid is supplied to one side of each of the pistons 8 and 9 via fluid lines 12 and 13 within the sub-circuits 10 and 11 respectively. Hydraulic fluid is similarly returned from the other side of the pistons 8 and 9 via fluid lines 14 and 15 respectively. Alternatively, pressure could be supplied to the sub-actuator chambers 5 and 6 via lines 14 and 15, and returned via lines 12 and 13 respectively.

Fluid is supplied to the lines 12 and 13 from hydraulic supply units 16 and 17 respectively via solenoid-controlled valves 18 and 19 which operate to switch the hydraulic supply units 16 and 17 into or out of the hydraulic sub-circuits 10 and 11 in response to electrical signals along lines 20 and 21 respectively. The sub-circuits 10 and 11 further include electro-hydraulic control valves 22 and 23 which operate to control, in a variable manner, the amount of fluid supplied along lines 12 and 13; these control valves 22 and 23 are controlled in response to electrical signals along lines 24 and 25 from amplifiers 26 and 27 respectively. A by-pass valve 28 is connected between the hydraulic supply and return lines 12 and 14 in sub-circuit 10; this by-pass valve is normally held closed by hydraulic signals from the unit 16 as supplied along line 29. When, however, the hydraulic supply unit 16 is switched out of the sub-circuit 10 by closing the valve 18, then the by-pass valve 28 is opened to short-circuit the hydraulic supply and return lines 12 and 14. A similar by-pass valve 30 is connected between the hydraulic supply and return lines 13 and 15 of sub-circuit 11 and is controlled in a similar manner in response to hydraulic signals from the supply unit 17 via line 31.

Each of the hydraulic lines 12 to 15 include a restrictor valve 32 to 35 respectively, located between the by-pass valves 28 and 30 and the actuator sub-chambers 5 and 6. These restrictor valves 32 to 35 are controlled by control units 36 and 37 in response to hydraulic signals from the supply units 16 and 17 respectively. The valves 32 to 35 can all be held open by one of the units 36 or 37, thus, unless both the hydraulic supply units 16 and 17 are switched out of the control system 2, all the restrictor valves 32 to 35 will be held open.

Differential pressure sensors 38 and 39 (the construction of which will be described later) are also connected between the hydraulic supply and return lines of the sub-circuits 10 and 11 respectively in a similar manner to the by-pass valves 28 and 30. The sensor 38 senses the differential pressure between lines 12 and 14 and produces a corresponding electrical output along line 40 whilst the sensor 39 senses the differential pressure between lines 13 and 15 and produces a corresponding electrical output along line 41.

In normal operation, the actuator 1 is controlled by the sub-circuit 10. Signals are supplied along line 42 via a switch 43 to the amplifier 26 and the electro-hydraulic control valve 22. These signals thereby control the amount of fluid supplied to line 12 and to one side of the piston 8 and hence also control movement of the actuator rod 3.

The signals on line 42 are derived from external control signals on line 44. These external control signals are supplied to a feedback unit 45 together with signals on line 46 from a sensor 47 which provides signals in accordance with the position of the actuator rod 3. The feedback unit 45 supplies signals on line 42 in accordance with the difference between the external control signals on line 44 and the position signals on line 46 in a well-known manner.

The sub-circuit 11 is normally held in an idling mode. The electro-hydraulic control valve 23 of sub-circuit 11 is, in this mode, controlled in response to signals along line 41 from the differential pressure sensor 39—these signals being supplied to the amplifier 27 via a switch 48 which is ganged to the switch 43 in the other sub-circuit 10. In this idling mode the fluid pressure supplied along line 13 to the actuator sub-chamber 6 is less than that supplied along line 12, being just sufficient to overcome friction of the piston 9. If, for example, the actuator rod 3 is moved downwards in FIG. 1 in response to control by sub-circuit 10, then the displacement of the piston 9 within the sub-chamber 6 will cause a corresponding increase in fluid pressure along line 15 and a decrease in the pressure along line 13 which would normally tend to resist movement of the rod 3. These changes in pressure, however, give rise to a change in the differential pressure sensed by the sensor 39 and hence a corresponding change in the output signal along line 41. This change of output signal is of a sense such as to cause an increase in the amount of fluid supplied along line 13 and therefore to overcome the resistance to movement of the actuator rod 3. When the actuator rod 3 is moved upwards, by supplying pressure along line 14, then the sub-circuit 11 will supply additional fluid along line 15 just sufficient to overcome resistance to this upward motion.

When a failure or malfunction is detected in sub-circuit 10, the sub-circuit 11 is switched automatically from the idling mode to an active mode in which it assumes full control of the actuator 1, the sub-circuit 10 being switched out of the system. The means by which such a failure or malfunction is detected will be described later but for this simplified description it will be assumed that this detection is provided by a control unit 49. This control unit 49 controls switching of the ganged switches 43 and 48. Upon detection of a malfunction in the sub-circuit 10 these switches 43 and 48 are switched to the position shown by the broken lines in FIG. 1 in which the sub-circuit 10 is disconnected from the signals on line 42. The electro-hydraulic control valve 23 in sub-circuit 11 is simultaneously switched out of connection with line 41 and into connection with line 50. Line 50 carries electrical signals derived from a feedback unit 51 in accordance with external control signals on line 52 and signals from a position sensor 53 in a similar manner to that described above for the other sub-circuit 10. The external control signals on line 52 may be from the same source as those on line 44, the two lines 44 and 52 being interconnected as shown by the dotted line 54. Alternatively, the control signals may originate from separate, nominally identical, sources.

Simultaneously with effecting the switching of switches 43 and 48, the control unit 49 supplies signals along line 55 to a switching unit 56. This switching unit 56 is connected in line 20 and controls operation of the solenoid-controlled valve 18. Upon detection of a failure in sub-circuit 10 signals are supplied along line 55 causing the hydraulic supply unit 16 to be disconnected from the sub-circuit 10 and hence also causing the by-pass valve 28 to open and short-circuit the hydraulic lines 12 and 14. Short-circuiting in this manner will permit relatively free movement of the piston 8 within the chamber 5. Disconnection of the unit 16 will also cause the restrictor valve control unit 36 to tend to close the restrictor valves 32 to 35 but, since the hydraulic supply unit 17 is still connected to the other restrictor valve control unit 37, these valves 32 to 35 will still be held open.

Switching of the sub-circuit 11 from an idling to an active mode can be effected relatively quickly. The speed of switching between idling and active modes is limited only by the speed of response of the electro-hydraulic control valve 23. Since the control valve 23 is already supplying pressure to lines 13 and 15, even in the idle mode, it merely has to increase or decrease the pressure accordingly when switched to the active mode. The control valve 23 can respond much more quickly in this way, typically in under 12.5 m seconds, than would be possible if a similar valve had to assume control from a fully closed state. Although the sub-circuit 10 can be quickly switched out of connection with the electrical line 42 it takes considerably longer, perhaps up to 100 m seconds, for the solenoid-controlled valve 18 to be closed completely and for the lines 12 and 14 to be short-circuited by opening the by-pass valve 28. During this time the sub-circuit 10 may be still producing an incorrect fluid pressure along line 12 and hence still applying a force tending to displace the actuator rod 3. This force produced by the sub-circuit 10 will, however, be opposed by the force developed by action of the sub-circuit 11 which is now operating in its active mode. The opposing force produced by the sub-circuit 11 may not be sufficient correctly to control the actuator rod 3 in response to signals along line 50 but it will in general be sufficient to prevent further substantial false displacement of the actuator rod and will therefore, in effect, stall the actuator 1. Once the fluid supply source 16 has been switched out of the sub-circuit 10 and the by-pass valve 28 has been opened, the sub-circuit 11 takes full control of the actuator 1. Thus it can be seen that the actuator 1 will be under the false control of sub-circuit 10 for, for example, 12.5 m seconds, in a stalled condition for, for example, 100 m seconds, and subsequently under the control of sub-circuit 11 alone.

If a failure or malfunction should occur in sub-circuit 11 whilst in its idle mode, the control unit 49 would supply signals along line 57 to a switching unit 58 which is connected in line 21 and which controls operation of the solenoid-controlled valve 19. These signals are such as to disconnect the hydraulic supply unit 17 from the sub-circuit 11 and thereby effect opening of the by-pass valve 30 and short-circuiting of the lines 13 and 15. In this way, if a failure occurs in this sub-circuit 11 it is effectively disconnected from the hydraulic system, the open by-pass valve 30 permitting free flow of hydraulic fluid between opposite sides of the piston 9 and hence relatively unimpeded movement of the actuator rod 3 under control of the sub-circuit 10 alone.

Figure 2:
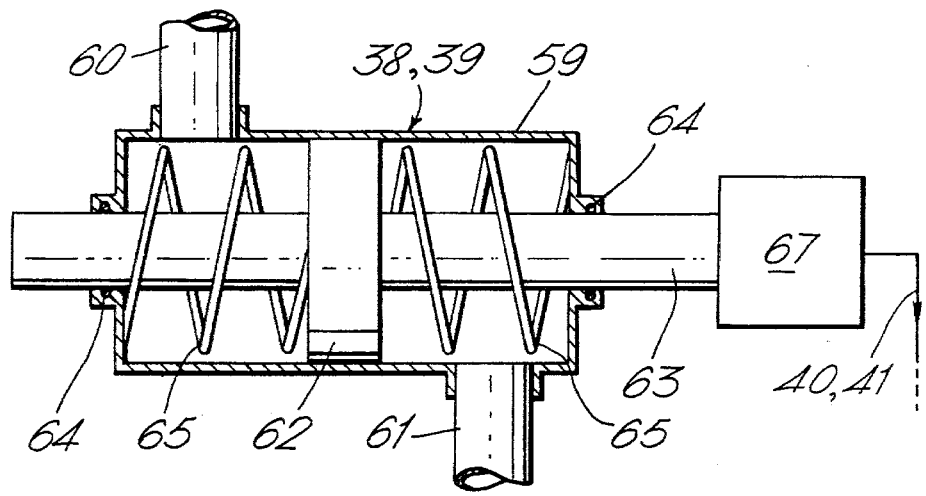
FIG. 2 shows a differential-pressure sensor as used in the system of FIG. 1.

The differential pressure sensors 38 and 39 may take the form shown in FIG. 2. The sensor shown is in the form of a cylinder 59 having two inlet ports 60 and 61 opening into opposite ends of the cylinder. A piston 62 is mounted within the cylinder 59 on an actuating rod 63 which extends coaxially of the cylinder. The actuating rod 63 is free to move axially of the cylinder 59, projecting from its end faces through fluid-tight seals 64. The piston 62 is normally urged to a central position within the cylinder 59 by two helical springs 65 and 66 located on opposite sides of the piston. Differential pressure applied between the inlet ports 60 and 61 causes movement of the piston 62 and actuating rod 63 along the cylinder 59, against the action of the springs 65 and 66. This movement is sensed by an electrical pick-off 67 which provides the electrical output signal along lines 40 or 41.

Figure 3:
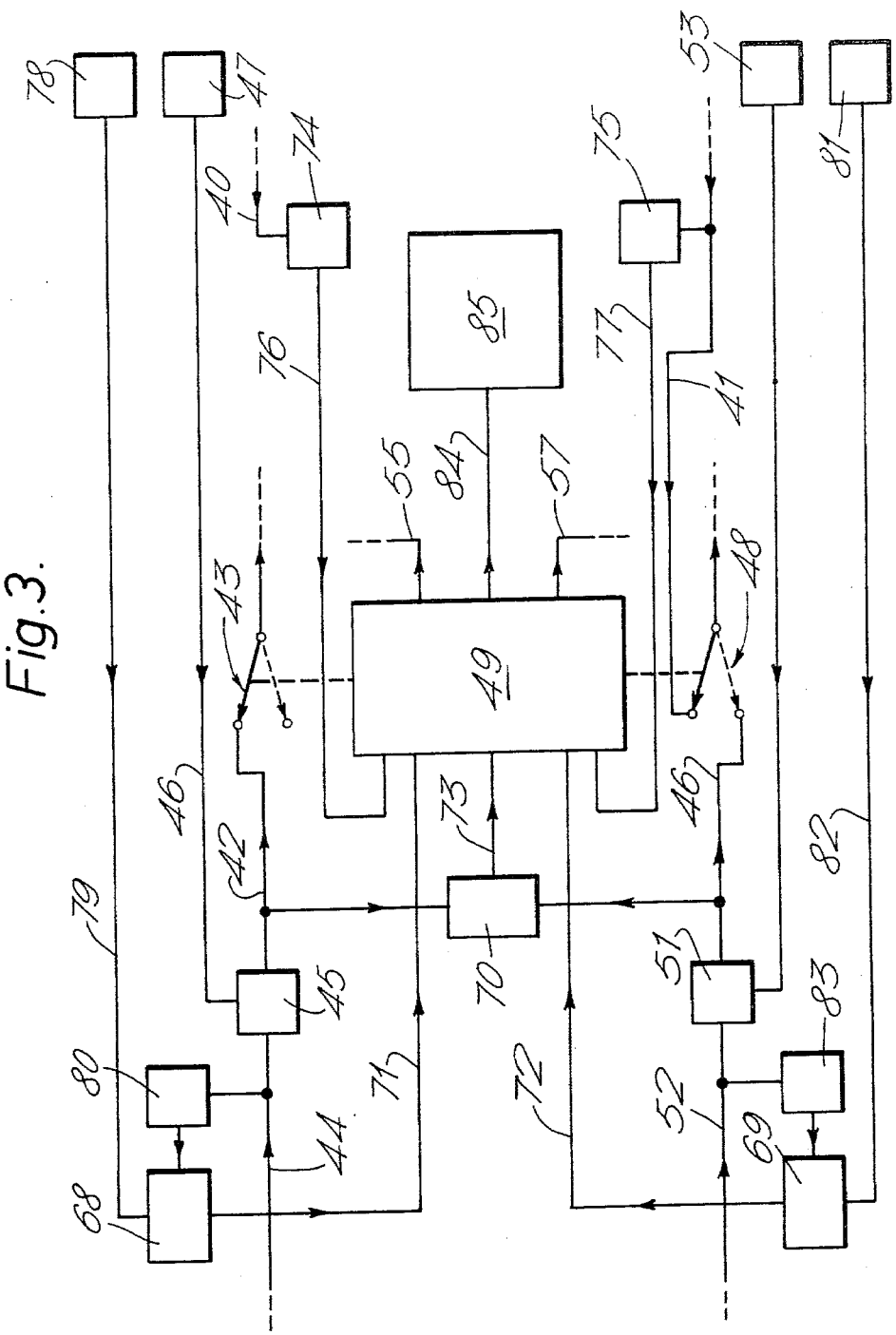
FIG. 3 represents schematically malfunction-detecting circuitry of the system of FIG. 1.

A more detailed consideration of the manner in which failure and malfunction of one or other of the sub-circuits 10 or 11 is detected is given below with reference to FIG. 3.

The control unit 49 is connected to receive input signals from comparator units 68, 69 and 70 via lines 71, 72 and 73 respectively, and from monitor units 74 and 75 via lines 76 and 77 respectively.

The comparator 68 compares signals from a position sensor 78, supplied via line 79, with signals derived from the external control signals as supplied to the sub-circuit 10 along line 44. The position sensor 78 responds to movement of the actuator rod 3 and may be of the same form as the sensors 47 and 53, and in this respect may be provided by a capacitance, optical, resistive or inductive pick-off or by any other similar well-known means. External control signals on line 44 are passed to a computing unit 80 which computes, in accordance with a stored model of the actuator 1, what signal would be expected from the position sensor 78 for the particular signal on line 44. This computed signal is supplied to the comparator 68 which provides an output signal on line 71 when the actual signal from sensor 78 and the expected, computed signal from unit 80 differ by a predetermined amount. Similarly, the comparator 69 associated with sub-circuit 11 provides a signal along line 72 to the control unit 49 when signals from a sensor 81, supplied via line 82, differ from those computed by a computing unit 83 in accordance with external control signals supplied to this sub-circuit along line 52.

The comparator unit 70 provides an output signal on line 73 when the difference between the two signals on lines 42 and 46 supplied by the feedback units 45 and 51 respectively exceeds a predetermined amount.

The monitor units 74 and 75 provide output signals along lines 76 and 77 to the control unit 49 when the differential pressure sensors 38 and 39 sense a high differential pressure. These monitor units are therefore responsive to, for example, the condition in which the actuator rod 3 is jammed and pressure builds up on one side of the piston 8 or 9.

The control unit 49, in addition to controlling operation of the switches 43 and 48, and the valves 18 and 19, also provides output signals indicative of the condition of various parts of the system, along line 84 to a maintenance panel or display unit 85. The maintenance panel 85 may also receive signals direct from various sensors disposed about the system and provide an indication of, for example, the state of different valves and the hydraulic pressure in different parts of the system.

Another important advantage of the present invention, in its use of two sub-circuits 10 and 11, is that it is possible continuously to monitor the performance of both sub-circuits, such as by appropriate indicators on the maintenance panel 85, even though the position of the actuator rod 3 is being controlled by only one sub-circuit. In this way it is possible to avoid switching to a sub-circuit which is considered to be performing incorrectly.

Various situations in which malfunction can occur will now be considered, together with the effect produced on the hydraulic system:

1. Sub-Circuit 10 in Active Control Mode (a) Faulty external control signals on line 44: This will cause a difference between the signals on lines 42 and 46 which will cause the comparator 70 to produce an output signal to the control unit 49. There will also be an initial, for example, excessively high, deflection of the actuator rod 3 which will cause a discrepancy between the signals from sensor 81 and computing unit 83 thereby causing the comparator 69 to produce an output signal to the control unit 49. Since there is no difference between signals from the sensor 78 and the computing unit 80, there will be no output signal from the comparator 68.

The effect of this will be to produce an appropriate indication on the maintenance panel 85.

(b) Faulty feedback signal from sensor 47: This will again cause an initial faulty signal on line 42 which will again lead to output signals from comparators 69 and 70 in the manner described in (a). However, since the signal computer by unit 80 is derived directly from the external control signals on line 44, prior to feedback control, there will in this instance be a difference between signals from the sensor 78 and that produced by the unit 80. The comparator 68 will therefore also produce an output signal to the control unit 49.

The effect of this will be to cause the control unit 49 to effect switching to sub-circuit 11 in the manner described earlier, with a momentary stall of the actuator 1.

(c) Failure of the electro-hydraulic control valve 22: This will cause a false hydraulic pressure to be applied to the sub-chamber 5 and hence a false movement of the actuator rod 3. There will therefore be differences between signals from the sensors 78 and 81 and the respective computing units 80 and 83 thereby causing the comparators 68 and 69 to produce output signals to the control unit 49.

The effect of this will be the same as in (b).

(d) Faulty position sensor 78: This will cause a difference between signals on line 79 and those derived by the computing unit 80, and hence cause the comparator 68 to produce an output signal along line 71 to the control unit 49.

The effect of this will be that the system will be switched to sub-circuit 11 but there will not be any stall of the actuator 1 since this is not being incorrectly controlled by sub-circuit 10.

(e) Failure of hydraulic supply unit 16: This will cause a false movement of the actuator rod 3 and hence differences between signals from the sensors 78 and 81, and the respective computing units 80 and 83. Output signals will therefore be produced by the comparators 68 and 69.

The effect of this will be to switch the system to control by sub-circuit 11. There may also be loss of control until the valve 18 is closed and the by-pass valve 28 is opened.

(f) Failure of by-pass valve 28 giving short-circuit of lines 12 and 14: This will again cause a false movement of the actuator rod 3 resulting in output signals from the comparators 68 and 69.

The effect of this will again be to switch the system to control by sub-circuit 11. There may also be a momentary loss of control as in (e).

(g) Malfunction of amplifier 26: This will cause a false pressure to be supplied to sub-chamber 5 of the actuator 1 and hence give rise to false movement of the actuator rod 3. Again, output signals will be produced by comparators 68 and 69.

The effect of this will be to switch to sub-circuit 11 with a momentary stall condition as in (b) and (c).

(h) False switching of switch 43 out of the active control mode: This will cause a false movement of the actuator rod 3, or will cause the actuator 1 not to respond to control. The comparators 68 and 69 will therefore produce output signals to the control unit 49.

The effect of this will be to switch to sub-circuit 11 and there will be a momentary loss of control until this switching occurs.

(i) Malfunction of differential pressure sensor 38: This will cause a false signal on line 40 to the monitor unit 74. If this signal falls outside preset limits, the monitor unit 74 will provide an output signal on line 76 to the control unit 49.

The only effect of this would be for the control unit 49 to provide an appropriate indication of the malfunction on the maintenance panel 85.

(j) Jammed actuator rod 3: Since the actuator rod 3 cannot move correctly in response to control signals there will be differences between the outputs of the sensors 78 and 81, and the computing units 80 and 83 respectively. The comparators 68 and 69 will therefore provide output signals to the control unit 49. Pressure will also build up on one side of the piston 8 within the sub-chamber 5 and this will cause the differential pressure sensor 38 to produce high signals to the monitor unit 74 which will in turn produce an output signal on line 76 to the control unit 49.

The effect of this will be to produce an appropriate indication on the maintenance panel 85.

Similar effects will be produced by malfunctions in sub-circuit 11 whilst in its idle mode, as outlined below:

2. Sub-Circuit 11 in Idle Mode (a) Faulty external control signals on line 52: This will cause the comparators 69 and 70 to produce output signals for supply to the control unit 49.

The effect of this will only be to produce an appropriate indication on the maintenance panel 85.

(b) Faulty feedback signals from sensor 53: This will cause comparator 70 alone to produce an output signal for supply to the control unit 49.

The effect of this will be to produce an appropriate indication on the maintenance panel 85.

(c) Failure of the electro-hydraulic control valve 23: This will cause false hydraulic pressure to be supplied to sub-chamber 6 of the actuator 1 by the sub-circuit 11. The comparators 68 and 69 will therefore produce outputs signals for supply to the control unit 49. The differential pressure sensors 38 and 39 will both produce excessively high signals and therefore the monitor units 74 and 75 will also supply signals to the control unit 49.

The effect of this will be that the control unit 49, in effect, by-passes the sub-circuit 11 by applying signals along line 57 to disconnect it from the hydraulic supply unit 17. There would also be a momentary stall of the actuator 1 until the sub-circuit 11 was disconnected.

(d) Faulty position sensor 81: This will cause comparator 69 to produce an output signal to the control unit 49.

The only effect of this will be to produce an appropriate indication on the maintenance panel 85.

(e) Failure of the hydraulic supply unit 17:

The only effect of this might be to cause a signal to be produced by a suitable hydraulics-failure sensor and an appropriate indication to be given on the maintenance panel 85.

(f) Failure of the by-pass valve 30 giving short-circuit between lines 13 and 15:

A suitable failure sensor could be incorporated in the by-pass valve 30 to provide an indication on the maintenance panel 85 upon failure. There would not normally be any other effect.

(g) Malfunction of amplifier 27: This would lead to false pressure supply to the sub-chamber 6 causing output signals from the comparators 68 and 69 and also from the monitor units 74 and 75.

The effect of this would be to cause the control unit 49 to by-pass sub-circuit 11 as in 1(c) after a momentary stall.

(h) False switching of switch 48 to an active control mode: If the control signals supplied to both sub-circuits 10 and 11 are identical then this would produce no effect. If the signals were, however, different there would be a mismatch of pressures supplied to the sub-chambers 5 and 6. If this happened the differential pressure sensors 38 and 39 would both produce high signals and these would correspondingly cause signals to be supplied by the monitor units 74 and 75 to the control unit 49.

The effect of such mismatched pressures would be to cause the control unit 49 to by-pass the sub-circuit 11 by disconnecting it from the hydraulic supply unit 17.

(i) Malfunction of the differential pressure sensor 39: This will cause the control valve 23 to supply the wrong pressure to the sub-chamber 6 which will therefore result in the comparators 68 and 69 generating an output signal to the control unit 49. The monitor unit 75 will also supply a signal to the control unit 49.

The effect of this will be momentary stall of the actuator 1 prior to by-passing sub-circuit 11.

(j) Jammed actuator rod 3: This will have the same effect as described in 1(j) above.

It will be appreciated that the hydraulic system may be modified in various ways.

The actuator need not be of the linear form described, it could, for example, be for effecting angular displacement and the system could be used in applications other than those in aircraft.

As mentioned earlier, the external control signals on lines 44 and 52 could originate from the same source. Suitable electrical circuitry could be provided to switch between a plurality of sources upon detection of a malfunction so that both sub-circuits 10 and 11 are supplied with external control signals from a correctly functioning source.

More particularly, the system could be supplied with signals from three nominally-identical sources. In this way, if signals from one source differed from the signals from the other two sources they would be rejected and the system operated under control of the two identical signal sources, or of an amalgamation of signals from the two sources.

We claim:

1. A control system of the kind for controlling, in response to control signals, the force applied to actuator means, so as thereby to produce a corresponding controlled displacement of said actuator means, the system including first and second circuits both of said circuits being capable of supplying signals to control said force, the improvement wherein said system includes: means for supplying first control signals to said first circuit, the said first circuit deriving first signals in accordance with said first control signals to control a major part of said force applied to said actuator; means for supplying second control signals, nominally-identical to said first control signals; means for deriving third control signals in accordance with the said force controlled by said first signals; means for supplying said third control signals to said second circuit, the said second circuit deriving second signals in accordance with said third control signals to control force applied to said actuator means at a level just sufficient to reduce the effect of resistance to displacement of the actuator means; and a control unit, the said control unit including means responsive to malfunction of said first circuit or error in said first control signals that effects switching of said second circuit from said third control signals to said second control signals such that, upon detection of said malfunction or error, said second signals control a major part of force applied to said actuator means.

2. A control system according to claim 1 wherein said control system is a fluid control system, said actuator means is a fluid-controlled actuator and wherein said first and second circuits are fluid supply circuits that control fluid pressure supplied to the said actuator.

3. A control system according to claim 2 for controlling fluid pressure supplied to a fluid-controlled actuator of the kind comprising a first chamber having one piston and a second chamber having another piston, the said first circuit including means for supplying fluid pressure to said first chamber, and the said second circuit including means for supplying fluid pressure to said second chamber.

4. A control system according to claim 3 wherein said system includes means for supplying signals representative of differential fluid pressure across said piston in said second chamber to the said means for deriving third control signals, the said third control signals being derived accordingly such as to reduce the said differential fluid pressure.

5. A control system according to claim 3 wherein said first circuit includes valve means and means connecting said valve means across the piston in said first chamber, wherein said system includes means for supplying signals from said control unit to said valve means such as to effect opening of said valve means and equalisation of pressure across the piston in said first chamber in response to malfunction of said first circuit or error in said first control signals.

6. A control system according to any one of the preceding claims including position sensor means; means mounting said sensor means to sense the position of said actuator; feedback means; means for supplying signals from said sensor means to said feedback means; and means for supplying external signals supplied to said system to said feedback means, the said feedback means deriving said first or second control signals in accordance with the difference between said external signals and the signals from the said sensor means.

7. A control system according to any one of claims 1 to 5 wherein said control unit includes means that responds to malfunction of said second circuit or error in said second or third control signals by effecting disconnection of said second circuit from control of said actuator means.

8. A control system according to claim 7 wherein said control system is a fluid control system, wherein said first and second circuits are fluid supply circuits, said actuator means being of the kind comprising a first chamber having one piston and a second chamber having another piston, the said first circuit including means for supplying fluid pressure to said first chamber, the said second circuit including: means for supplying fluid pressure to said second chamber; second valve means; and means connecting said second valve means across the piston in said second chamber, and wherein said system includes means for supplying signals from said control unit to said second valve means such as to effect opening of said valve means and equalisation of pressure across the piston in said second chamber in response to malfunction of said second circuit or error in said second or third control signals.

9. A control system according to any one of claims 1 to 5 wherein said system includes: computing means; means for supplying to said computing means external signals supplied to the system, the computing means including a stored model of said actuator means and said computing means deriving from said stored model computed signals representative of the position of said actuator means corresponding to said external signals; position sensor means; means mounting said sensor means to sense the position of said actuator means; comparator means; means for supplying to said comparator means said computed signals and the signals from said sensor means, the said comparator means deriving an output signal in response to difference between its input signals; and means for supplying said output signals to said control unit for use in detection of malfunction of said circuits or of errors in said control signals.

10. A control system for controlling the fluid pressure supplied to a fluid-controlled actuator of the kind comprising a first chamber having one piston and a second chamber having another piston, the said system comprising: a first fluid supply circuit; means for supplying first control signals to said first circuit, the said first circuit deriving first fluid pressure in accordance with said first control signals; means for supplying said first fluid pressure to said first chamber to control a major part of pressure supplied to said actuator; means for supplying second control signals, nominally-identical to said first control signals; means for deriving third control signals in accordance with differential fluid-pressure across the piston in said second chamber; a second fluid supply circuit; switching means operable in normal operation of said system to supply said third control signals to said second circuit, the said second circuit deriving second fluid pressure in accordance with said third control signals; means for supplying said second fluid pressure to said second chamber such as to reduce the differential fluid-pressure across the piston in said second chamber; and a control unit, the said control unit including means responsive to malfunction of said first circuit or error in said first control signals that effects switching of said switching means to supply to said second circuit said second control signals instead of said third control signals and that effects disconnection of said first circuit from control of said actuator such that said second circuit controls a major part of fluid pressure supplied to said actuator.

* * * * *